United States Patent
Verstallen

(10) Patent No.: US 7,249,574 B2
(45) Date of Patent: Jul. 31, 2007

(54) APPARATUS FOR PRODUCING A DIESEL-OIL/WATER MICROEMULSION AND FOR INJECTING THE EMULSION INTO A DIESEL ENGINE

(76) Inventor: Adrian Verstallen, Schiffhorst 208A, Dortmund (DE) D-44339

( * ) Notice: Subject to any disclaimer, the term of this patent is extended or adjusted under 35 U.S.C. 154(b) by 0 days.

(21) Appl. No.: 11/514,063

(22) Filed: Aug. 31, 2006

(65) Prior Publication Data

US 2007/0056534 A1    Mar. 15, 2007

(30) Foreign Application Priority Data

Sep. 15, 2005   (DE) ...................... 10 2005 044 046

(51) Int. Cl.
*F02B 47/02* (2006.01)
(52) U.S. Cl. .................. 123/25 A; 123/25 E; 123/575; 44/301
(58) Field of Classification Search ............. 123/25 A, 123/25 C, 25 D, 25 E, 25 R, 575; 44/301, 44/302, 325, 326
See application file for complete search history.

(56) References Cited

U.S. PATENT DOCUMENTS

| | | | | |
|---|---|---|---|---|
| 4,388,893 A | * | 6/1983 | Apfel | ......................... 123/25 J |
| 4,714,066 A | * | 12/1987 | Jordan | ......................... 123/447 |
| 5,174,247 A | * | 12/1992 | Tosa et al. | ................. 123/25 C |
| 5,245,953 A | * | 9/1993 | Shimada et al. | ........... 123/25 E |
| 5,560,344 A | * | 10/1996 | Chan | ........................... 123/515 |
| 5,682,842 A | * | 11/1997 | Coleman et al. | ........... 123/25 C |
| 5,771,848 A | | 6/1998 | Bastenhof | |
| 6,368,366 B1 | * | 4/2002 | Langer et al. | ................. 44/301 |
| 6,530,964 B2 | * | 3/2003 | Langer et al. | ................. 44/301 |
| 2004/0006911 A1 | * | 1/2004 | Hudson | ........................ 44/301 |
| 2005/0126513 A1 | | 6/2005 | Hendren | |

FOREIGN PATENT DOCUMENTS

| | | |
|---|---|---|
| DE | 228 594 A1 | 10/1985 |
| DE | 696 03 823 T2 | 4/2000 |
| DE | 199 48 464 A1 | 4/2001 |
| EP | 0 742 363 A1 | 11/1996 |
| EP | 0 780 558 B1 | 6/1997 |

* cited by examiner

*Primary Examiner*—Carl S. Miller
(74) *Attorney, Agent, or Firm*—Laurence A. Greenberg; Werner H. Stemer; Ralph E. Locher

(57) ABSTRACT

An apparatus produces a diesel-oil/water microemulsion and injects the emulsion into a diesel engine. The apparatus has three high pressure cylinders, inlets of two of the high pressure cylinders are connected to a static raw emulsion premixer. Outlets of the two high pressure cylinders are connected to a homogenizing valve. An inlet of the third high pressure cylinder is connected to the outlet of the homogenizing valve and the outlet of the third high pressure cylinder is connected to the diesel engine. The three pistons of the three high pressure cylinders are constituent parts of a pressure booster whose drive piston is guided in a drive cylinder which is connected to a hydraulic drive unit.

13 Claims, 1 Drawing Sheet

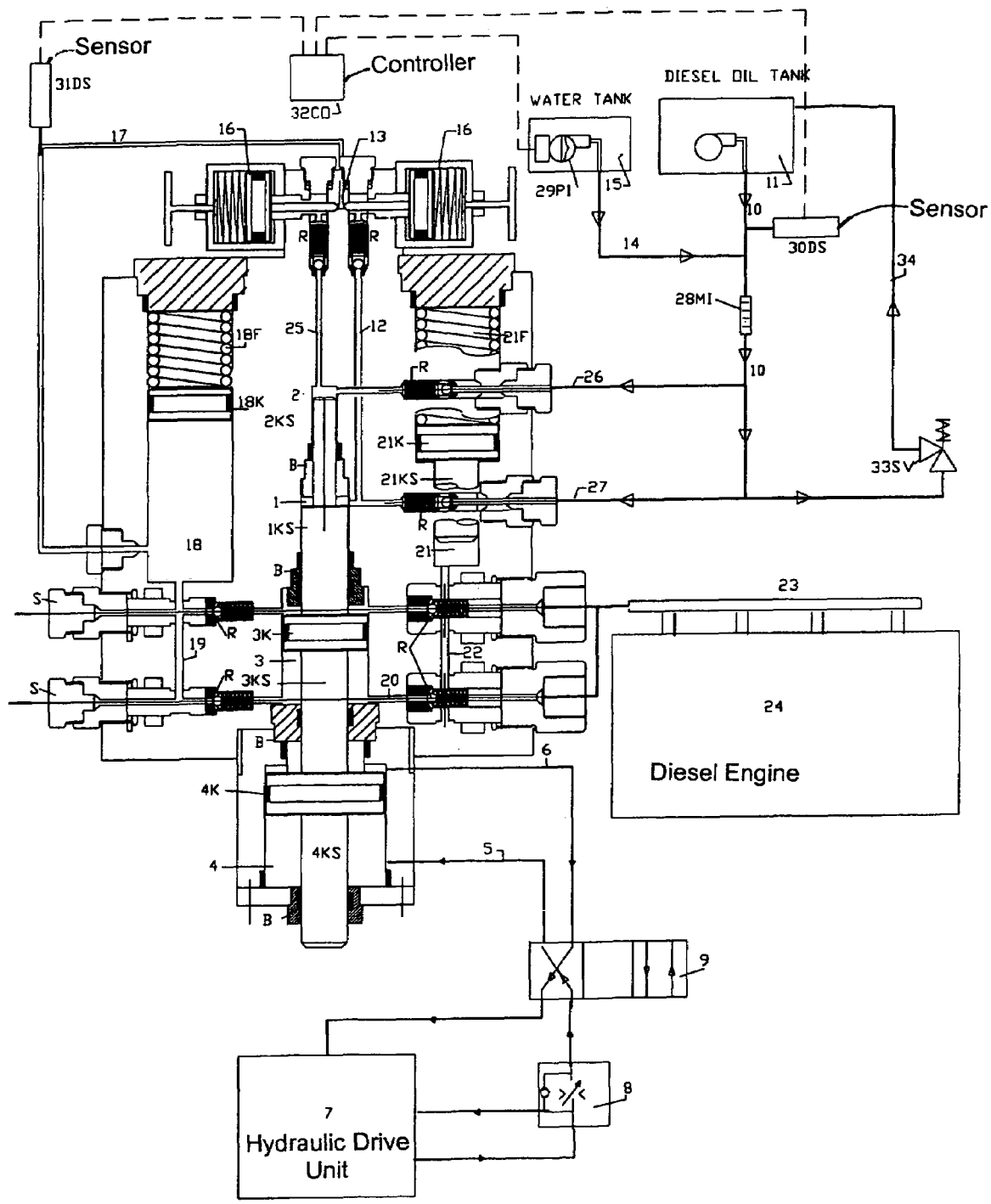

APPARATUS FOR PRODUCING A DIESEL-OIL/WATER MICROEMULSION AND FOR INJECTING THE EMULSION INTO A DIESEL ENGINE

CROSS-REFERENCE TO RELATED APPLICATION

This application claims the priority, under 35 U.S.C. §119, of German application DE 10 2005 044 046.0, filed Sep. 15, 2005; the prior application is herewith incorporated by reference in its entirety.

BACKGROUND OF THE INVENTION

Field of the Invention

The invention relates to an apparatus for producing a diesel-oil/water microemulsion and for injecting the emulsion into a diesel engine.

Diesel-oil/water mixtures are tried and tested fuels for driving diesel engines. Here, it has been proven that much cleaner combustion is obtained with an emulsion of this type as a fuel than with pure diesel oil. The pollutants such as particulate matter, soot particles and $NO_x$ in the exhaust gases can be reduced to minimum values as a function of the proportion of water in the emulsion. It is however a disadvantage that diesel-oil/water emulsions are not very stable. The two phases separate after a very short time if they are not kept stable by an additive, a so-called emulsifier.

For widespread use of a diesel-oil/water emulsion as a fuel, stable emulsions would have to be pre-produced with the addition of emulsifiers in large facilities, and stored in large tank facilities. In addition, filling stations would have to be equipped with additional filling devices. The investment expenditure for this would be enormous and impossible under the given economic conditions.

A liquid fuel supply apparatus for a diesel internal combustion engine is known from German patent DE 696 03 823 T2. A liquid fuel supply apparatus has a mixer, to which fuel and water are supplied, the fuel/water mixture thus formed subsequently traveling to the injection pumps of the engine. Although the apparatus can be directly installed in a motor vehicle, a stable diesel-oil/water emulsion cannot, however, be obtained with such an apparatus.

A fuel system for two non-mixable fuels, for example diesel fuel and alcohol, is known from DD 228 594 A1. The fuels are held in two separate fuel containers and are supplied to a mixing and metering pump in order to be mixed and metered, and travel from there to the fuel feed pump.

A common rail fuel injection system for internal combustion engines is known from published, non-prosecuted German patent DE 199 48 464 A1. The common rail fuel injection system has a high pressure fuel store for feeding a plurality of injectors which serve to inject fuel into the combustion chamber of the internal combustion engine. Here, the high pressure fuel store is hydraulically coupled to a low pressure store by a hydraulic booster device.

SUMMARY OF THE INVENTION

It is accordingly an object of the invention to provide an apparatus for producing a diesel-oil/water microemulsion and for injecting the emulsion into a diesel engine which overcomes the above-mentioned disadvantages of the prior art devices of this general type, with which a diesel-oil/water emulsion for the diesel engine can be prepared in the motor vehicle itself.

With the foregoing and other objects in view there is provided, in accordance with the invention, an apparatus for producing a diesel-oil/water microemulsion and for injecting the microemulsion into a diesel engine. The apparatus includes a static raw emulsion premier, a homogenizing valve having an outlet, and first, second and third high pressure cylinders having inlet lines, outlets and pistons. The inlet lines of the first and second high pressure cylinders are connected to the static raw emulsion premier, and the outlets of the first and second high pressure cylinders are connected to the homogenizing valve. The inlet line of the third high pressure cylinder is connected to the outlet of the homogenizing valve, and the outlet of the third high pressure cylinder is connected to the diesel engine. A pressure booster having a drive piston is connected to a hydraulic drive unit. The three pistons of the high pressure cylinders are constituent parts of the pressure booster, and the pressure booster has a drive cylinder and the drive piston is guided in the drive cylinder.

The apparatus has the three high pressure cylinders, the inlets of the first and second high pressure cylinders are connected to a water/diesel-oil raw emulsion premixing system and the outlets of the first and second high pressure cylinders are connected to the homogenizing valve and the inlet of the third high pressure cylinder is connected to the outlet of the homogenizing valve and the outlet of the third high pressure cylinder is connected to the diesel engine. The three pistons of the three high pressure cylinders are constituent parts of a pressure booster whose drive piston is guided in a drive cylinder which is connected to a hydraulic drive unit.

With the apparatus according to the invention, it is possible to prepare a diesel-oil/water emulsion in a motor vehicle itself. Here, only a small auxiliary water tank having a metering pump is required, the metering pump metering the water into the diesel oil supply line between the diesel oil tank and the apparatus in a controlled fashion as a function of density, the two liquids being mixed in a static mixer in the supply line to form a water/diesel-oil raw emulsion.

High-pressure homogenization (pressures of the order of magnitude of 2000 bar) can briefly be described as the homogeneous mixing of two liquids by a pressure release. The pressure release is provided by virtue of a raw emulsion first being produced from the two liquids and the raw emulsion being forced at high pressure through a narrow gap, resulting in the pressure energy being converted into flow energy. Shear and cavitation effects generate very small droplets whose size, at high homogenizing pressures, is in the nm range. The narrow gaps can be formed by valves or are disposed in the corresponding nozzles. The resulting mixtures of the nm-sized droplets of the two liquids are denoted as microemulsions. Microemulsions have relatively large droplet surface areas overall and are relatively highly reactive and therefore ensure efficient combustion.

Only a simple pressure booster is necessary to obtain the required high pressures, in which pressure booster three pistons of relatively small diameter in high pressure cylinders are simultaneously synchronously linearly driven by a hydraulic drive cylinder having a large piston diameter, a previously produced water/diesel-oil raw emulsion being pumped to the homogenizing valve in the first high pressure cylinder and the second high pressure cylinder in approximately equal quantities. The third cylinder constitutes the injection pump, by which the diesel-oil/water emulsion formed is fed to the high pressure distributor of the diesel engine.

In a very particularly preferred embodiment, it is provided that the three high pressure cylinders are disposed in series in a row and share a common single-part or multi-part piston rod with the drive cylinder. All the cylinders of the apparatus are therefore disposed in a row or line. They are lifted and lowered synchronously. As a result, it is even possible, if appropriate, to dispense with piston seals if the instances of play between the pistons and the cylinders are narrow enough and the pressures are only reduced slightly from one cylinder to the next. Here, slight leakage from one cylinder to the other is acceptable, since a blending of the liquids is not critical, since a mixture is indeed to be formed anyway.

It can also alternatively be provided that the three high pressure cylinders are disposed adjacent to one another in parallel. The pressure booster then has a sort of plate, the three parallel piston rods of the three high pressure cylinders being disposed at one side of the plate and the piston rod of the drive cylinder being disposed at the other side of the plate.

In order to be capable of providing the required high pressure of approximately 2000 bar in the three high pressure cylinders in a particularly simple manner, it is provided that the cross section of the drive piston is significantly larger than the sum of the cross sections of the pistons of the three high pressure cylinders. For example, the three high pressure cylinders can have piston diameters of 12.6, 17.8 and 21.8 mm, while the drive piston has a diameter of 70 mm. The ratio of the piston areas or of the annular areas between the driving and the driven pistons is then approximately 1:8.0. The hydraulic drive unit is then only required to provide a pressure of approximately 250 bar in order to obtain the required pressures of approximately 2000 bar in the three high pressure cylinders.

In a further embodiment, it is provided that a first buffer store is disposed between the outlet of the homogenizing valve and the inlet of the third high pressure cylinder. The buffer store serves to buffer the emulsion produced in the homogenizing valve, and is intended to equalize any pressure fluctuations.

A second buffer store which is connected to the outlet of the third high pressure cylinder is also provided, the second buffer store serving to buffer the emulsion which has been brought to a high pressure of approximately 2000 bar as it travels from the injection pump (third high pressure cylinder) to the engine distributor, and equalizing pressure fluctuations of the system.

The control of the drive piston is preferably effected by the mass flow of the hydraulic oil of the hydraulic drive unit to the drive cylinder by a regulating valve by the accelerator pedal of the diesel engine.

In order to drive the hydraulic unit, it is preferably provided that the hydraulic drive unit has a torque transmitting element for providing a connection to the crankshaft of a motor vehicle. A separate drive for the hydraulic unit can then be dispensed with.

In a further particularly advantageous embodiment, it is provided that the homogenizing valve is embodied as a counterflow valve. Here, the two raw emulsion flows, supplied from the first and second hydraulic cylinders, are mixed and homogenized in the counterflow. Each valve side is preferably composed of a spindle with a conical valve cone which are both inserted into a central sharp-edged cylindrical seat.

The spindle is adjusted hydraulically. The seat is shrunk into the block. The spindles are formed in open ducts which are connected to hydraulic cylinders. The pistons of the hydraulic adjusting cylinders are connected to the spindles of the valve and, by springs, press the spindles with the cones into the cylindrical bore of the seat. The pressure built up by the pressure booster presses against the underside of the piston which presses against the preloaded spring. Here, the cone is raised from the valve seat to an extent such that homogenizing takes place at the same pressure at all times regardless of the mass flow. The two liquids flow counter to one another in layers at high speed via the narrow gap between the valve cones and the edge of the seat. The pressure is depleted rapidly from 2000 bar to approximately 100 bar and the liquid droplets which are reduced by shear and cavitation effects are mixed with a high degree of turbulence.

In order to minimize the installation size of the apparatus to as great a degree as possible, it is very particularly preferably provided that the three high pressure cylinders, the drive cylinder and/or the two buffer stores are embodied as bores in a common housing block.

Other features which are considered as characteristic for the invention are set forth in the appended claims.

Although the invention is illustrated and described herein as embodied in an apparatus for producing a diesel-oil/water microemulsion and for injecting the emulsion into a diesel engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is is a diagrammatic illustration of an apparatus according to the invention.

DESCRIPTION OF THE PREFERRED EMBODIMENTS

Referring now to the single FIGURE of the drawing, there is shown an apparatus according to the invention for producing a diesel-oil/water microemulsion and for injecting the emulsion into a diesel engine. The apparatus initially has three high pressure cylinders, specifically a first high pressure cylinder 1 and a second high pressure cylinder 2 for the water/diesel-oil raw emulsion, and a third high-pressure cylinder 3 for a water/diesel-oil microemulsion. A dual-acting drive cylinder 4 is also provided.

In the particularly preferred embodiment which is illustrated, the three high pressure cylinders 1, 2, 3 and the drive cylinder 4 are disposed in series in a row and are embodied as pressure boosters. In addition, in the embodiment illustrated, all three high pressure cylinders 1, 2, 3 and the drive cylinder 4 share a common single-part or multi-part piston rod whose sections are denoted, depending on the cylinder, by 2KS, 1KS, 3KS and 4KS.

The first high pressure cylinder 1 has, for example, a piston diameter of 17.8 mm and a rod diameter of 12.6 mm and therefore an annular area of 124.16 mm$^2$, the second high pressure cylinder 2 has a piston diameter of 12.6 mm and a cross section of 124.69 mm², and the third high pressure cylinder 3 has a piston diameter of 21.8 mm and a rod diameter of 17.8 mm and therefore an annular area of 124.40 mm². The entire cross section of the three high pressure cylinders 1, 2, 3 is therefore 373.25 mm².

The piston diameter of the drive cylinder 4 is, for example, 70 mm, the piston rod 4KS has a diameter of 21.8 mm, and the annular area is therefore 2996.30 mm².

This results in an area ratio of 8.0 between the drive cylinder 4 and the driven high pressure cylinders 1, 2, 3.

It is therefore necessary to generate a pressure of approximately 250 bar in the drive cylinder 4 in order to be capable of obtaining a high pressure of 2000 bar in each of the three high pressure cylinders 1, 2, 3.

The single-part or multi-part common piston rod of the four cylinders is stepped, that is to say is formed with increasing diameters from the cylinder 2 via the cylinder 1 to the cylinder 3 and to the cylinder 4. The common piston rod preferably simultaneously serves, as illustrated, as pistons of the high pressure cylinders 1 and 2 in the small high pressure cylinders 2 and 1, while in the relatively large cylinders, the piston rod 3KS supports an additional piston 3K, and in the drive cylinder, the piston rod 4KS supports an additional piston 4K. The piston rod is guided in sleeves B, having seals, in each of the individual cylinders.

All the cylinders 1, 2, 3, 4 are preferably embodied as bores in a common housing block.

The drive cylinder 4 is connected via hydraulic lines 5, 6 to a hydraulic drive unit 7, specifically with a regulating valve 8 and a servo valve 9 connected in between. The drive unit 7 and/or a hydraulic pump is preferably connected, by a non-illustrated belt drive, to the crankshaft of the vehicle which is to be equipped with the apparatus.

The connections of the high pressure cylinders 1, 2, 3 are embodied as now described.

The inlets of the two high pressure cylinders 1 and 2 are connected via the lines 26 and 27 and are in each case connected by a non-return valve to a static mixer 28MI for producing the raw emulsion. The outlets of the two high pressure cylinders 1 and 2 for the high pressure supply of the raw emulsion are connected via the high pressure lines 12 and 25 and are in each case connected by further non-return valves R to a homogenizing valve 13.

A diesel oil tank 11 is connected to the static mixer 28MI via a line 10. The water for producing the raw emulsion is metered by a metering pump 29PI from a water tank 15 into the line 10 upstream of the static mixer 28MI via a line 14. The metering pump 29PI is controllable and meters the water quantity as a function of the measured density of the diesel oil and of the predefined mixture ratio. By recirculating the emulsions into the diesel oil tank, for example, when releasing the pressure of a safety valve 33SV or when recirculating the excess microemulsion from the engine region, the proportion of water in the diesel oil is increased, and the density of the diesel oil changes. As a result of this, the density of the diesel oil which is extracted from the tank must be continually measured in order to adapt the supply of the water for producing the raw emulsion.

The metering pump 29PI is controlled by a controller 32CO which receives measured values both from a density sensor 30DS in the diesel oil supply line 10 and from the density sensor 31DS in the microemulsion line 17 downstream of the homogenizing valve 13, and also receives signals from a engine controller, and processes the measured values and signals in a cascaded control operation.

In the event of any pressure increase in the raw emulsion lines 26 and 27 as a result of the discharge being reduced, the safety valve 33SV in the line 10 is opened and excess raw emulsion is guided back into the diesel oil tank 11 via line 34.

The homogenizing valve 13 is embodied as a counterflow valve in which the two raw emulsions which are at a high pressure of approximately 2000 bar and are fed from the two high pressure cylinders 1 and 2, are mixed and homogenized in the counterflow. Each valve side of the homogenizing valve 13 has a spindle with a conical valve cone which are both inserted into a central sharp-edged cylindrical seat. The spindle is adjusted by hydraulic control cylinders 16. The seat is shrunk into a block. The spindles are guided in open ducts which are connected to hydraulic control cylinders 16. The pistons of the hydraulic cylinders 16 are connected to the spindles of the valve and, by springs, press the spindle with the cone into the cylindrical bore of the seat. The pressure built up by the pressure booster presses against the underside of the piston which presses against the preloaded spring. Here, the cone is raised from the valve seat to an extent such that homogenizing takes place at the same pressure at all times regardless of the mass flow. The two liquid flows of diesel oil and water impinge on one another at supersonic speeds via the narrow gap between the valve cone and the edge of the seat. The pressure is depleted rapidly from approximately 2000 bar to 100 bar and the liquid droplets which are reduced by collision, shear and cavitation effects are mixed with a high degree of turbulence and form a microemulsion.

The microemulsion is supplied via a high pressure line 17 to a buffer store 18. The buffer store 18 is embodied as a cylinder in which a piston 18K is guided, the piston 18K being acted on by a tension spring 18F. An outlet of the buffer store 18 is connected via two high pressure ducts 19 and in each case one non-return valve R to the high pressure cylinder 3, at both sides of the dual-acting piston 3K. Plugs in the bores which hold the non-return valves R are denoted by S.

The outlet of the high pressure cylinder 3 is connected via two high pressure lines 20 having non-return valves R, and via a high pressure line 22, to a further buffer store 21, and is connected to a high pressure distributor 23 which is to be connected to a diesel engine 24 of the vehicle.

The buffer store 21 is constructed in the same way as the buffer store 18. The buffer store 21 is embodied as a cylinder in which a piston 21K is guided under the load of a tension spring 21F.

All three of the high pressure cylinders 1, 2, 3 and the buffer stores 18, 21 are preferably disposed together in one housing block as non-continuous bores. The piston seals in the high pressure cylinders 1, 2, 3 are preferably provided by plastic seals which are stressed by a special spring, or by metal seals. The seals are held in position by pressure screws.

The non-return valves R which are provided at the inlet and at the outlet of each high pressure cylinder 1, 2, 3 serve to prevent the intake liquid flowing back into the inlet ducts at high pressure, and to prevent the liquid which has been pumped up to high pressure from flowing back into the cylinder during the intake stroke.

Diesel oil and water from the diesel tank 11 and the water tank 15 are mixed in the static mixer to form a raw emulsion, and are then supplied to the high pressure cylinders 1 and 2. During the intake stroke, the two media flow into the cylinder spaces and, during the pressure stroke, are fed to the homogenizing valve 13 via the high pressure lines 12 and 25 respectively. The two liquids flow counter to one another at high speed via the narrow gap between the valve cone and the edge of the seat of the valve. The pressure is depleted rapidly from 2000 bar to approximately 100 bar and the liquid droplets which are reduced by shear and cavitation effects are mixed with a high degree of turbulence.

After leaving the homogenizing valve 13, the diesel-oil/water microemulsion which is formed flows via the high pressure line 17 to the buffer store 18, in which the emulsion is held at a pressure of 10 bar. The buffer store 18 is connected via the high pressure lines 19 to the third high pressure cylinder 3. As a result, the piston 3K of the high pressure cylinder or injection cylinder 3 is dual-acting, and the intake and pressure in each case alternates from one side of the cylinder to the other. The quantity of emulsion supplied during the reciprocating movement of the piston 3K corresponds to the quantity which is supplied from the homogenizing valve 13 to the buffer store 18. During the intake stroke, the emulsion is pressed at a pressure of 10 bar from the buffer store 18 into the third high pressure cylinder 3. In the high pressure duct 19, the non-return valves R prevent the high pressure emulsion from flowing back into the buffer store 18 during the pressure stroke. A rupture plate (not illustrated in any more detail), having an outlet disposed outward into the high pressure line 17, is intended to protect the buffer store 18 in the event of an excess pressure in the event of failure of the non-return valve R.

During the pressure strokes, the emulsion flows from the third high pressure cylinder 3 to the diesel engine 24 through the high pressure lines 20 at a pressure of approximately 2000 bar. The buffer store 21 is likewise connected via the line 22 to the outlet of the high pressure cylinder 3. The buffer store 21 equalizes pressure fluctuations which are generated by fluctuations in the speed of the motor vehicle.

The non-return valves R are likewise provided in the high pressure line 20 between the high pressure cylinder 3 and the connection of the buffer store 21, the non-return valves R preventing a return flow from the buffer store 21 into the high pressure cylinder 3.

The invention is of course not restricted to the exemplary embodiment illustrated. Further embodiments are also possible without departing from the basic concepts. It can thus also be provided, as an alternative to the preferred embodiment illustrated, that the three high pressure cylinders 1, 2, 3 are disposed not in series but rather parallel to one another.

I claim:

1. An apparatus for producing a diesel-oil/water microemulsion and for injecting the microemulsion into a diesel engine, the apparatus comprising:
    a static raw emulsion premixer;
    a homogenizing valve having an outlet;
    first, second and third high pressure cylinders having inlet lines, outlets and pistons, said inlet lines of said first and second high pressure cylinders connected to said static raw emulsion premixer, said outlets of said first and second high pressure cylinders connected to said homogenizing valve, said inlet line of said third high pressure cylinder connected to said outlet of said homogenizing valve, said outlet of said third high pressure cylinder connected to the diesel engine;
    a hydraulic drive unit; and
    a pressure booster having a drive piston connected to said hydraulic drive unit, said three pistons of said high pressure cylinders being constituent parts of said pressure booster, said pressure booster having a drive cylinder and said drive piston being guided in said drive cylinder.

2. The apparatus according to claim 1, wherein said first, second and third high pressure cylinders are disposed in series and share a common single-part or multi-part piston rod with said drive cylinder.

3. The apparatus according to claim 1, wherein said first, second and third high pressure cylinders are disposed adjacent to one another in parallel.

4. The apparatus according to claim 1, wherein said drive piston has a cross section significantly larger than a sum of cross sections of said pistons of said first, second and third high pressure cylinders.

5. The apparatus according to claim 1, further comprising a first buffer store disposed between said outlet of said homogenizing valve and said inlet line of said third high pressure cylinder.

6. The apparatus according to claim 5, further comprising a second buffer store connected to said outlet of said third high pressure cylinder.

7. The apparatus according to claim 1, further comprising a regulating valve disposed between said drive cylinder and said hyrdraulic drive unit, a control of said drive piston being effected by a mass flow of hydraulic oil of said hydraulic drive unit to said drive cylinder by said regulating valve by an accelerator pedal of the diesel engine.

8. The apparatus according to claim 1, wherein said hydraulic drive unit has a torque transmitting element for providing a connection to a crankshaft of a motor vehicle.

9. The apparatus according to claim 1, wherein said homogenizing valve is embodied as a counterflow valve.

10. The apparatus according to claim 6, wherein said first, second and third high pressure cylinders, said drive cylinder and/or said first and second buffer stores are embodied as bores in a common housing block.

11. The apparatus according to claim 1, further comprising a first line disposed between a diesel oil tank and said inlet lines of said first and second high pressure cylinders, said said static raw emulsion premier for producing the water/diesel-oil raw emulsion is disposed in said first line.

12. The apparatus according to claim 11, further comprising:
    a second line disposed between a water tank and said first line; and
    a controllable metering pump disposed in said second line.

13. The apparatus according to claim 12, further comprising:
    a microemulsion line; and
    a cascaded control device having a control unit, a first density sensor disposed in said first line and connected to said control unit, a second density sensor disposed in said microemulsion line and connected to said control unit, said control unit receiving signals from said first and second density sensors, said control unit further connected to said controllable metering pump and controlling said controllable metering pump for adjusting a water/diesel-oil ratio of the microemulsion.

* * * * *